(12) United States Patent
Feng et al.

(10) Patent No.: US 12,621,794 B2
(45) Date of Patent: May 5, 2026

(54) SYSTEM AND METHOD FOR ROAD MONITORING

(71) Applicant: Hong Kong Applied Science And Technology Research Institute Co., Ltd., Shatin (HK)

(72) Inventors: Jiashi Feng, Shenzhen (CN); Alpamys Urtay, Pak Shek Kok (HK); Hang Chen, Kowloon Bay (HK); Xinghua Zhu, Shenzhen (CN); Dongzhe Su, Shenzhen (CN); Shijun Fan, Fanling (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 393 days.

(21) Appl. No.: 18/116,412

(22) Filed: Mar. 2, 2023

(65) Prior Publication Data

US 2024/0298294 A1    Sep. 5, 2024

(51) Int. Cl.
| | |
|---|---|
| *H04W 64/00* | (2009.01) |
| *G06T 7/73* | (2017.01) |
| *H04L 67/12* | (2022.01) |

(52) U.S. Cl.
CPC .............. *H04W 64/006* (2013.01); *G06T 7/73* (2017.01); *G06T 2207/10028* (2013.01); *G06T 2207/30236* (2013.01); *H04L 67/12* (2013.01)

(58) Field of Classification Search
CPC ................. H04W 64/006; H04L 67/12; G06T 2207/10028; G06T 2207/30236; G06T 7/73
See application file for complete search history.

(56) References Cited

U.S. PATENT DOCUMENTS

| | | | |
|---|---|---|---|
| 9,858,817 B1 | 1/2018 | Bletzer et al. | |
| 11,252,723 B1 * | 2/2022 | Lu ........................... | H04W 4/46 |

(Continued)

FOREIGN PATENT DOCUMENTS

| | | |
|---|---|---|
| CN | 108932869 A | 12/2018 |
| CN | 110962744 A | 4/2020 |

(Continued)

OTHER PUBLICATIONS

Shi et al, "VIPS: Real-time Perception Fusion for Infrastructure-Assisted Autonomous Driving", 28th Annual International Conference on Mobile Computing and Networking, Oct. 17, 2022, Publisher: Mobicom 2022, Published in: Sydney, AU.

(Continued)

*Primary Examiner* — Raymond S Dean
(74) *Attorney, Agent, or Firm* — GableGotwals

(57) ABSTRACT

A method and a system for road monitoring, comprises the steps of receiving, via a communication module, a first point cloud data from one or more designated road side units (RSUs) from one or more of a plurality of RSUs located in a defined geographical area; receiving, via the communication module, a second point cloud data from one or more designated vehicle on-board data processing units of vehicles located in the defined geographical area; processing, via a processing module, the first point cloud data and the second point cloud data to generate a processed point cloud data; and transmitting, via the communication module, information derived from the processed point cloud data to one or more of the RSUs and/or the vehicle on-board data processing units of vehicles located in the defined geographical area.

16 Claims, 7 Drawing Sheets

(56) References Cited

U.S. PATENT DOCUMENTS

| | | | | |
|---|---|---|---|---|
| 2015/0018020 A1* | 1/2015 | Elovici | ......... | H04W 4/029 |
| | | | | 455/457 |
| 2021/0105451 A1* | 4/2021 | Oyman | ......... | H04N 19/597 |
| 2021/0225171 A1 | 7/2021 | Cao | | |
| 2021/0402898 A1* | 12/2021 | Alvarez | ......... | B60N 2/501 |
| 2022/0206502 A1* | 6/2022 | Zhang | ......... | G08G 1/164 |
| 2022/0278933 A1* | 9/2022 | Wu | ......... | H04W 4/021 |

FOREIGN PATENT DOCUMENTS

| | | |
|---|---|---|
| CN | 111222441 A | 6/2020 |
| CN | 111489564 A | 8/2020 |
| CN | 111524357 A | 8/2020 |
| CN | 111567131 A | 8/2020 |
| CN | 112767475 A | 5/2021 |
| CN | 113160571 B | 10/2021 |
| CN | 113744532 A | 12/2021 |
| CN | 114173307 A | 3/2022 |
| CN | 114332494 A | 4/2022 |
| CN | 114488179 A | 5/2022 |
| CN | 114987460 A | 9/2022 |
| CN | 115547105 A | 12/2022 |
| CN | 115690119 A | 2/2023 |
| JP | 2022106885 A * | 7/2022 |
| WO | 2022141912 A1 | 7/2022 |

OTHER PUBLICATIONS

Zhang et al, "EMP: Edge-assisted Multi-vehicle Perception", 27th Annual International Conference on Mobile Computing and Networking,, Jan. 31, 2021, Publisher: MobiCom 2021, Published in: New Orleans, LA.

* cited by examiner

20

20

Roadside sensor

Obstacle

SYSTEM AND METHOD FOR ROAD MONITORING

FIELD OF THE INVENTION

The invention relates to a system and a method for road monitoring and, more particularly, but not exclusively, to a system and a method for detecting blind areas of vehicles and/or other monitoring agents at a road.

BACKGROUND OF THE INVENTION

Connected and Autonomous Vehicles (CAVs) are vehicles configured with an aim to assist or replace human drivers by automating at least some of the driving tasks. In contrast to conventional vehicles which have typically been configured to use only real-time data retrieved from on-board vehicle modules such as visual sensors to determine or detect potential threats on the road, CA Vs utilize the Vehicle-to-Everything (V2X) communications protocol, which is a vehicular communication protocol configured to deliver information from a vehicle to any entity that may affect the vehicle, and vice versa. The V2X protocol assists by enabling communicating information and/or data exchanges between vehicle on-board data processing units and, for example, roadside infrastructure for road safety, management, and/or threat determination purposes. A V2X system incorporates other more specific types of communications including, but not limited to, Vehicle-to-Infrastructure (V2I), Vehicle-to-Vehicle (V2V), Vehicle-to-Pedestrian (V2P), Vehicle-to-Device (V2D), and Vehicle-to-Grid (V2G), etc.

Very often, CAVs are equipped with sensors for collecting point clouds; a point cloud comprising a collection of individual data points in a three-dimensional space, with each data point being assigned with a set of coordinates within the X, Y, and Z axes. Point cloud data is particularly useful in object detection, path planning and vehicle control by the CAVs. Similarly, road-side units (RSUs) such as road-side sensors or other connectivity devices may also be capable of collecting point clouds, and subsequently, transmitting the point cloud data to the edge servers through Cellular-Vehicle-to-Everything (C-V2X) channels.

Conventional visual sensors mounted on a vehicle are known to suffer from a limited field of view due to the size and height of the vehicle and also the presence of other objects near to and around the vehicle on the road. Among the various V2X networks, V2V cooperative perception requires each vehicle to transmit their precise location, which is sometimes challenging due to common environmental constraints such as, when the vehicles are located in dense urban areas. Furthermore, V2V communication networks such as Dedicated Short Range Communication (DSRC) and Long-Term Evolution-direct (LTE-direct) networks which offer bandwidths of around 10 Mbps will not be suitable to support sharing of raw point cloud data directly from sensors among multiple agents such as CAVs and RSUs. Sharing processed data instead of raw point cloud data is often undesirable as it would neglect valuable information that is extractable from point clouds, which would be essential for robust localization of vehicles and, furthermore, may introduce latency to the delivery of the processed data.

CN114173307A discloses an optimization method based on a roadside perception fusion system. The method comprises the steps of taking vehicle-end positioning (vehicle-end high-precision GNSS, inertial navigation or high-precision map combined positioning) as a positioning truth value, and transmitting the positioning truth value to a roadside unit based on a vehicle-road cooperation mode; and determining the sensing accuracy of the roadside sensing equipment.

CN114332494A discloses a three-dimensional target detection and identification method based on multi-source fusion by a vehicle. Different environment information are captured through different roadside equipment sensors, with multi-modal features being extracted and then transmitted to a roadside feature fusion center. The roadside feature fusion center then fuses the obtained multi-path multi-modal features into multi-source fusion features for vehicle to perform target identification and detection.

CN112767475A discloses an intelligent roadside sensing system based on C-V2X, radar and vision. For visual target detection and radar multi-target tracking, a lightweight target detection neural network model and a weighted neighborhood data association multi-target tracking algorithm based on unscented Kalman filtering are applied. A multi-sensor fusion time synchronization method based on an interpolation and extrapolation method is designed to synchronize data collected from different sensors, and then in combination with C-V2X communication, a fusion result is corrected and compensated through vehicle-road cooperation data.

US2021225171A1 discloses a vehicle-to-infrastructure cooperation information processing method comprising generating first on-board perception data including data of an obstacle around the target vehicle sensed by the target vehicle; generating virtual obstacle data for representing the target vehicle according to positioning data of the target vehicle; generating second on-board perception data based on the virtual obstacle data and the first on-board perception data; and fusing the second on-board perception data with roadside perception data to obtain fusion data, the fusion data including all obstacle data in both the second on-board perception data and the roadside perception data, and the obstacle data in the roadside perception data including obstacle data for representing the target vehicle.

CN111524357A discloses a multi-data fusion method for safe driving of vehicles. The method comprises the steps of acquiring dynamic information, feature information, road condition information and traffic state information of driving vehicles in a target range by utilizing a plurality of roadside sensors mounted beside a road; acquiring motion state information, surrounding road conditions and environment information of the driving vehicles by utilizing vehicle-mounted units arranged on the vehicles; through a roadside service platform, performing first fusion on the information acquired by the roadside sensors and the information acquired by the vehicle-mounted units; through the roadside service platform, performing secondary fusion on data; analyzing to obtain abnormal event data information, and fusing the abnormal event data information with the abnormal event data information of the vehicles for the third time to obtain final abnormal event information; and performing fourth fusion on the generated final abnormal event information and the high-precision map data of the region to generate a new high-precision map and corresponding cooperative traffic schemes, early warning information, alarm information and vehicle control information.

WO2022141912A1 relates to a vehicle-road collaboration-oriented sensing information fusion representation and target detection method, in which compressed voxel features are sent from the vehicle to the roadside equipment to perform map fusion.

CN111222441A relates to a point cloud target detection and blind area target detection method and a system based on vehicle-road cooperation. The method comprises the steps of performing image target detection and position measurement and calculation; performing target classification based on a checker; determining a target detection scheme according to the target classification result of the checker; and performing point cloud target detection by using a Pointnet++algorithm.

Despite the foregoing disclosures, there remains a need for developing a mechanism based on multi-agent cooperative perception for improving vehicular road safety.

Objects of the Invention

An object of the invention is to mitigate or obviate to some degree one or more problems associated with known systems and methods for road monitoring with an aim to improve vehicular road safety.

The above object is met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method for road monitoring. The method comprises the steps of receiving, via a communication module, a first point cloud data from one or more designated RSUs from one or more of a plurality of RSUs located in a defined geographical area; receiving, via the communication module, a second point cloud data from one or more designated vehicle on-board data processing units of vehicles located in the defined geographical area; processing, via a processing module, the first point cloud data and the second point cloud data to generate a processed point cloud data; and transmitting, via the communication module, information derived from the processed point cloud data to one or more of the plurality of RSUs and/or vehicle on-board data processing units of vehicles located in the defined geographical area.

In a second main aspect, the invention provides a method of detecting blind areas at a road. The method comprises the steps of receiving, via a communication module, a first point cloud data from one or more RSUs located in a defined geographical area; receiving, via the communication module, a second point cloud data from one or more vehicle on-board data processing units of vehicles located in the defined geographical area; processing, via a processing module, the first point cloud data and the second point cloud data to generate a processed point cloud data to identify potential blind areas within the defined geographical area; dividing, via the processing module, the identified potential blind areas into a plurality of subsections; retrieving, from one or more designated vehicle on-board data processing units of vehicles located in the defined geographical area, point cloud data corresponding to respective one or more subsections of the plurality of subsections.

In a third main aspect, the invention provides a road monitoring system. The system comprises a communication module configured to receive a first point cloud data from one or more designated RSUs from one or more of a plurality of RSUs located in a defined geographical area; and a second point cloud data from one or more designated vehicle on-board data processing units from vehicle on-board data processing units of vehicles located in the defined geographical area; and a processing module configured to process the received first point cloud data and second point cloud data to generate a processed point cloud data; wherein the processed point cloud data is transmitted, via the communication module, to one or more of the plurality of RSUs and/or vehicle on-board data processing units of vehicles located in the defined geographical area.

In a fourth main aspect, the invention provides a road monitoring system. The system comprises a memory for storing data and a processor for executing computer readable instructions, wherein the processor is configured by the computer readable instructions when being executed to implement the method of the preceding first and/or the second main aspects.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
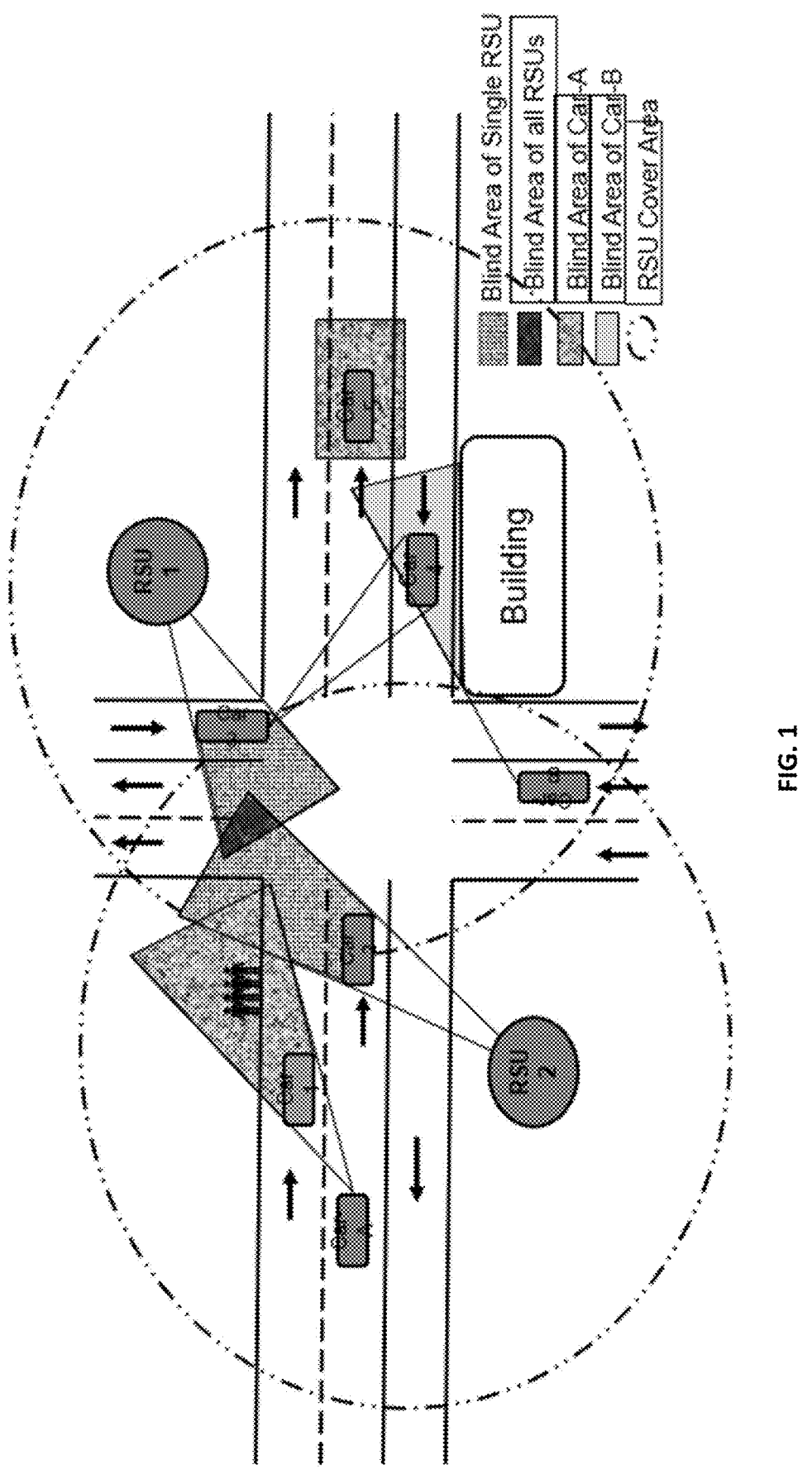
FIG. 1 is a schematic diagram illustrating an exemplary road condition.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the figures may be implemented in various forms of hardware, software, or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of systems or devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring to FIG. 1, shown is a schematic diagram illustrating an exemplary road condition or environment in which a conventional road monitoring system is applied. The conventional system may comprise CAVs with various sensors for purposes including, but are not limited to, the collection of data for object detection, path planning and vehicle control, etc. In the context of the present invention, the term "Connected and Autonomous vehicles (CAVs)" should be given a broad meaning to cover any vehicles equipped with one or more on-board processing units which allow Vehicle-to-Everything (V2X) connectivity. The system may, alternatively or additionally, comprise road-side infrastructures such as RSUs, which may include static sensors such as radar devices, light detection and ranging (Lidar) devices and/or cameras, as well as other communication devices arranged at fixed locations such as along the roadside for providing connectivity and/or information support to nearby vehicles and/or other road side connectivity agents. Particularly, RSUs can be configured to collect data such as point cloud data and to transmit the collected point cloud data to one or more servers such as edge servers and/or remote servers through Cellular-Vehicle-to-Everything (C-V2X) channels. In an exemplary scenario such as the one shown in FIG. 1, the presence of vehicle "Car 1" on the road creates a blind area for vehicle "Car-A". It will be dangerous if any pedestrians located in or near the blind area may cross the road without the driver of vehicle Car-A becoming aware or being informed of their presence. Similarly, it will be unsafe if vehicle Car-A overtakes in front of vehicle Car 2 in view of the limited view provided by its own sensor(s), the blocked view caused by vehicle Car 2, and the road intersection ahead.

Figure 2:
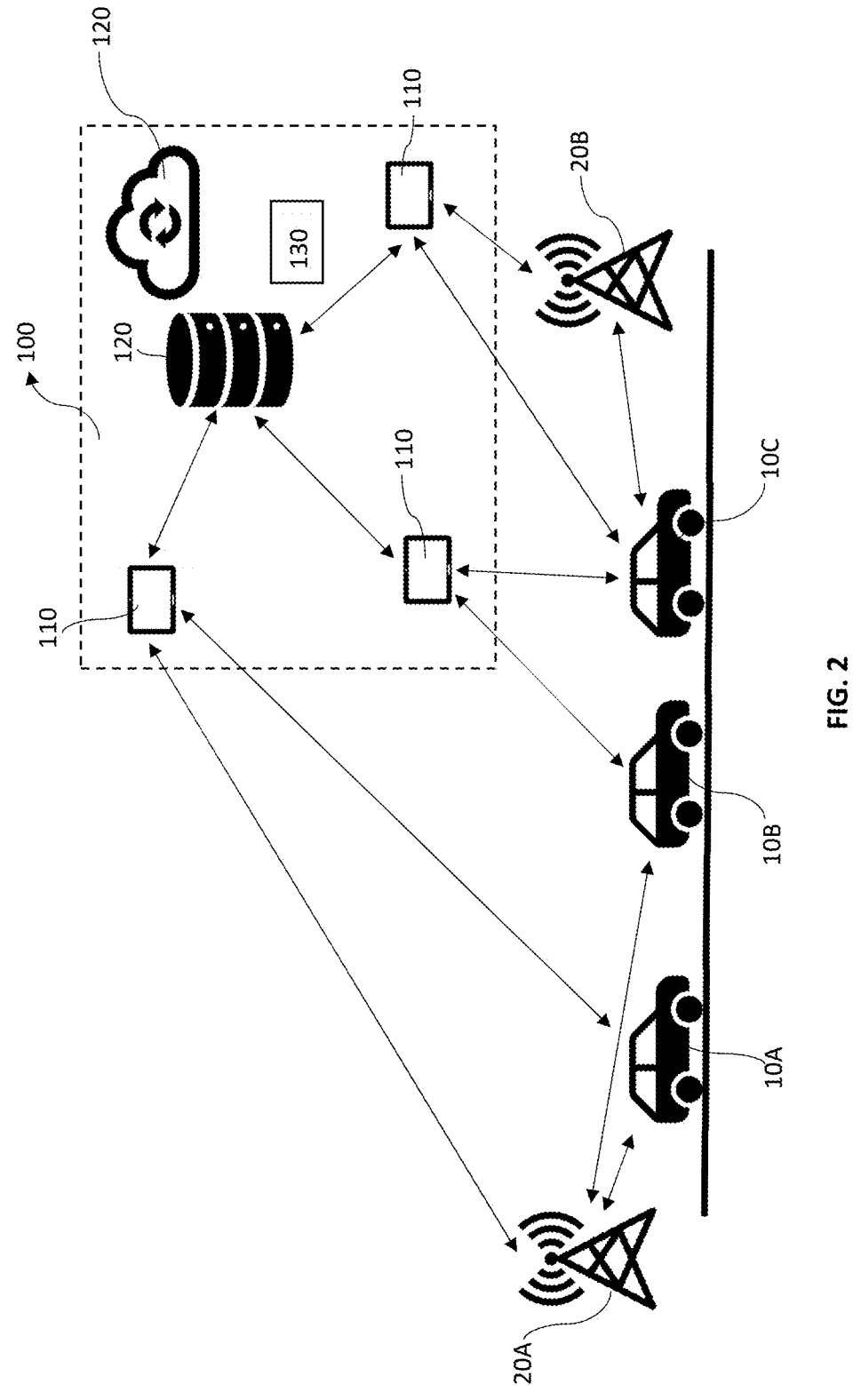
FIG. 2 is a schematic diagram illustrating a road monitoring system according to an embodiment of the present invention.

Referring to FIG. 2, a road monitoring system 100 according to the present invention involves an infrastructure based, multi-agent cooperative perception system to effectively detect objects located at blind spots and/or blind areas for vehicles on the road and/or road-side connectivity agents. The system 100 of the invention can usefully be implemented in, for example, the road environment of FIG. 1 and is found to significantly expand view coverage offered by the vehicles' on-board processors and/or RSUs. As in the traffic condition shown in FIG. 1, the communication module 110 of the system 100, which can be provided in the form of one or more edge nodes 110, can be configured to collect sensor data from multiple agents including the CAVs on the road and road-side infrastructures such as RSUs to expand coverage of traditional sensors. When the communication module 100 receives data from the RSUs such as RSU2 (FIG. 1) detecting pedestrians located in the blind area of Car-A, the communication module 110 may send view information related to the blind area to Car-A to avoid accidents. Similarly, prior to overtaking Car 2, Car-A may initiate a request to the communication module 110 for view information at the front to ensure safety prior to overtaking.

The system 100 may comprise one or more communication modules 110, which can be provided in the form of any processor units such as edge nodes or other processing devices. Particularly, the communication modules 110 is configured to receive a first point cloud data from one or more designated RSUs 20A/B from the RSUs 20 located in a defined geographical area. The communication module 110 is configured to receive also a second point cloud data from one or more designated vehicle on-board data processing units 10A/B/C from of vehicles 10, which can be CAVs, located in the defined geographical area. The system 100 further comprises a processing module 120 configured to process the received first point cloud data and second point cloud data to generate a processed point cloud data. In one embodiment, the processing module 120 can be provided as or arranged at one or more edge servers 120 and/or remote servers 120. Preferably, the processing module 120 can be configured with one or more V2X platforms for processing and analyzing data received from one or more of the CAVs 10 and/or the RSUs, as well as receiving and transmitting data and information therebetween. After the point cloud data is processed by the processing module 120, the processed point cloud data is transmitted, via the communication module 110, to one or more of the RSUs 20 and/or the vehicle on-board data processing units 10 of CAVs located in the defined geographical area. In the context of the present invention, road-side infrastructures such as RSUs can be arranged or configured with sensors such as radar devices, light detection and ranging (Lidar) devices and/or cameras as well as other communication devices preferably arranged at a fixed locations such as along the road for providing connectivity and/or information support to the nearby vehicles and/or other road side connectivity agents. The RSUs are preferably adapted to communicate, including to receive and transmit data, to and from one or more of the CAVs 10 and/or other connectivity agents such as other same or different types of RSUs and other processing devices such as the processing module 120 via the V2X communication protocol including one or more Cellular-Vehicle-to-Everything (C-V2X) channels. Particularly, the RSU 20 can be configured to collect point cloud data and to transmit the collected point cloud data to one or more servers such as edge servers and/or remote servers through C-V2X channels.

Figure 3:
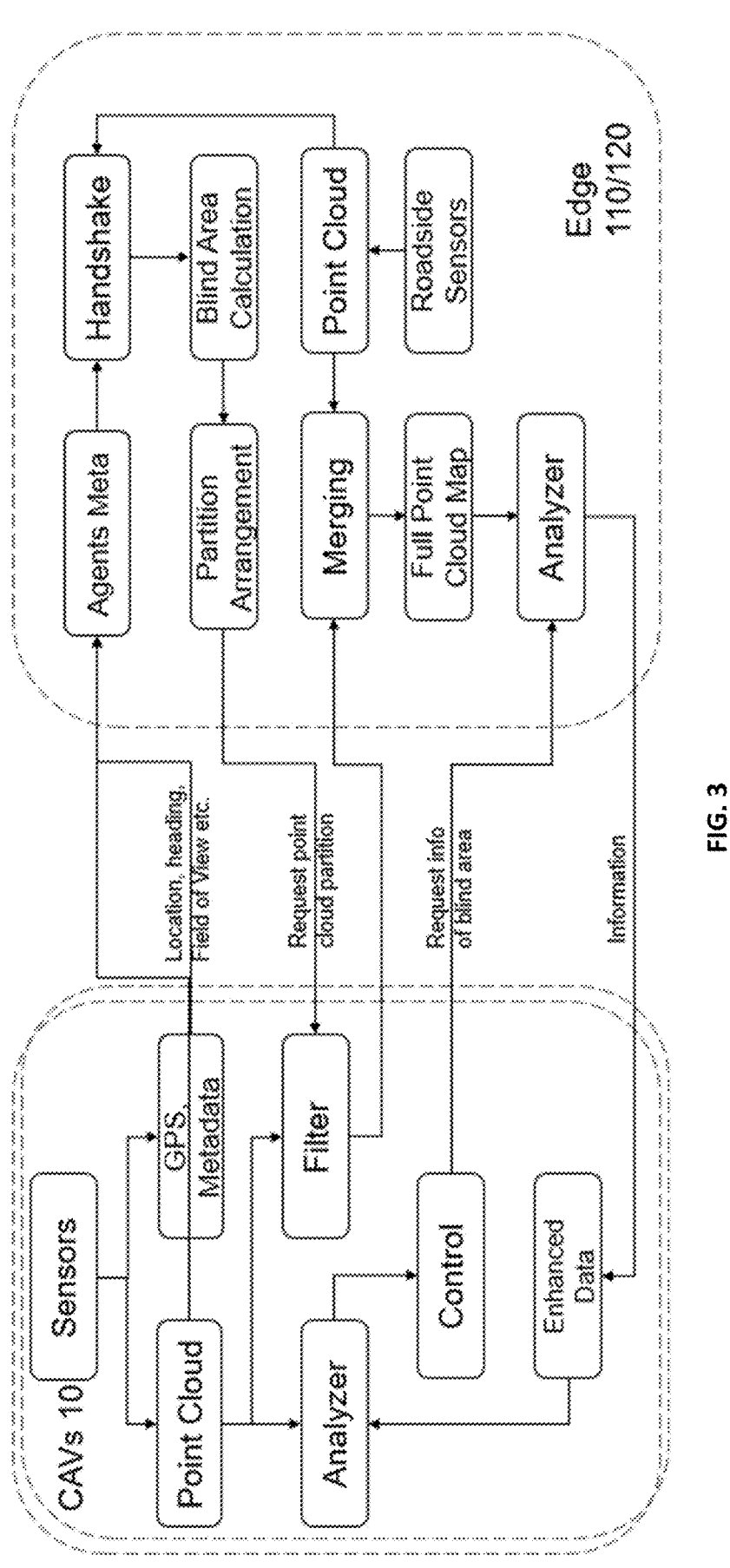
FIG. 3 is a flow diagram showing features of the road monitoring system of FIG. 2.

In the embodiment as shown in FIG. 3, the communication module 110, which can be provided as or comprises one or more edge nodes, may connect with each of the CAVs 10 located in the geographical area to receive general location data, such as via one or more self-positioning technologies e.g., a global positioning system (GPS). When the GPS data is unstable such as when the area of interest is a heavily dense area which may affect reception from the GPS, the communication module 110 may, in addition to or alternatively, receive the second point cloud data from the CAVs 10 and the first point cloud data from the RSUs 20 at the geographical area. The received data will then be processed and analyzed by the processing module 120 such as an edge server 120 implementing a V2X platform to identify any potential blind areas in the traffic condition or environment. In one embodiment, the processing module 120 can be configured to divide the detected potential blind areas into a plurality of subsections or partitions, and preferably, into non-overlapping subsections or partitions. One or more of the plurality of subsections may then be assigned or allocated to one or more surrounding agents within the geographical area, which may include one or more of the CAVs 10 and/or the RSUs 20. The communication module 110 will send a request for collecting point cloud data from the one or more of the CAVs 10 and/or the RSUs 20 in respect of a corresponding or selected one or more of the plurality of subsections or partitions assigned or allocated to one or more surrounding agents within the geographical area. The allocation of subsections or partitions to the surrounding agents may be based on an estimated perception range of these agents, as well as the network bandwidth according to their respective metadata. The requested point cloud of the subsections will be sent from the respective agents to the communication module 110, which will be integrated, by the processing module 120, by merging with existing data to form a full point cloud map representing a global view of the area. The communication module 110 will then send information derivable from the integrated point cloud data, which may include guidance in relation to the potential blind areas, to one or more CAVs 10 in the geographical area to enhance perception capability of said CAVs 10. In one embodiment, the CAVs may initiate requests for view information from the edge nodes 110; alternatively, the edge server 120 based on its data analysis may automatically transmit the view information to one or more CAVs potentially affected by the detected blind areas.

Figure 4:
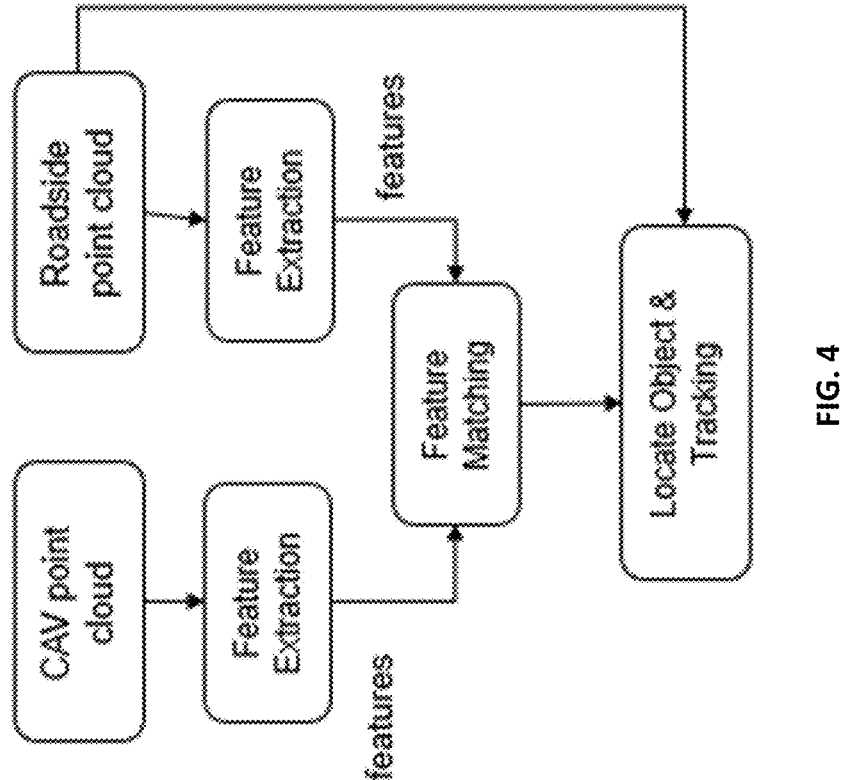
FIG. 4 is a flow diagram showing processing of point cloud data according to an embodiment of the present invention.

Upon receiving the first point cloud data from the RSUs and the second point cloud data from the CAVs, the received first point cloud data and second point cloud data will be compared and/or merged for data processing. Particularly, the received first point cloud data from the RSUs 20 and second point cloud data from the CAVs 10 will be processed, by the processing module 120, to extract point clouds related to one or more features of interest, and subsequently, the respective point clouds will be compared, merged and matched to identify any required information such as information to locate an object and/or to collect information relating to a potential blind area. For example, in one embodiment, it is possible to locate and track objects such as the locations of the CAVs 10 based on point cloud registration when the GPS data is unstable, as shown in FIG. 4.

Figure 5:
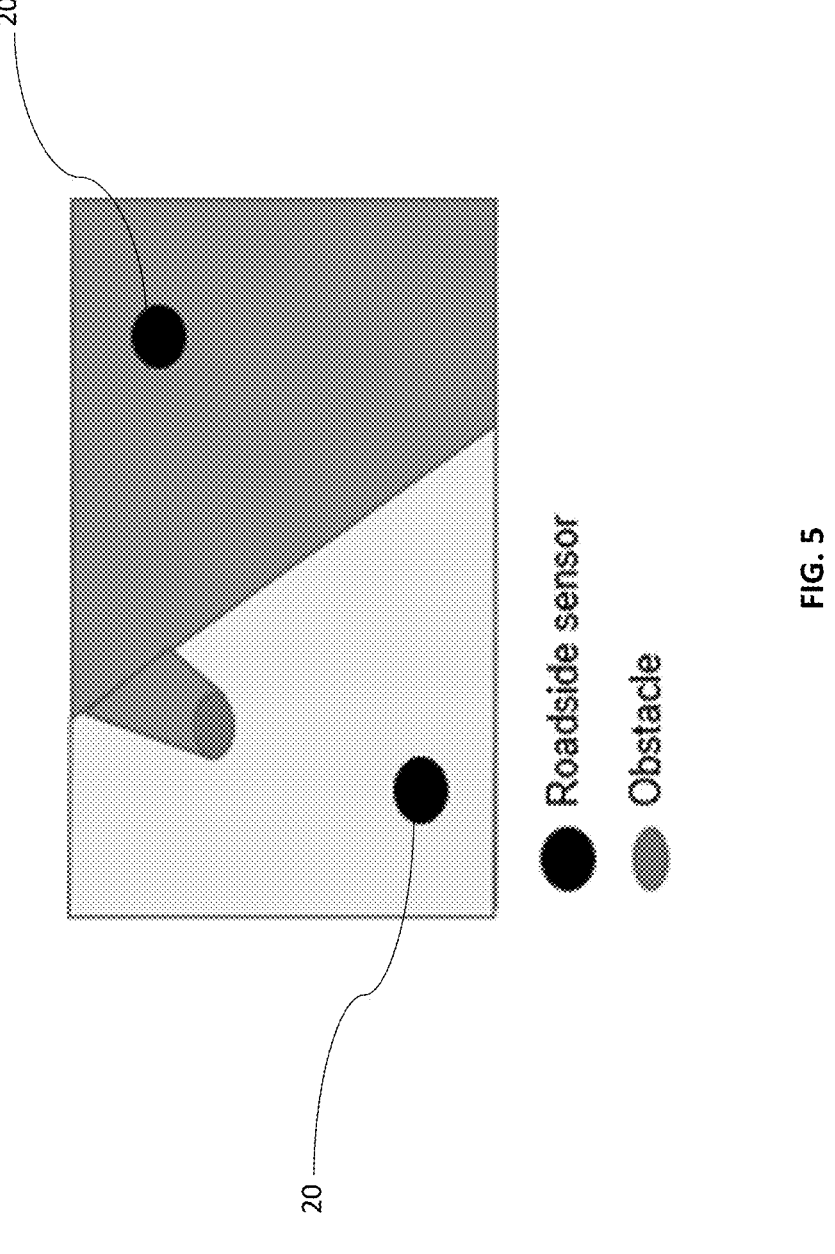
FIG. 5 is a schematic diagram showing the formation of a blind area caused by an obstacle entering a coverage area of an RSU.
Figure 6:
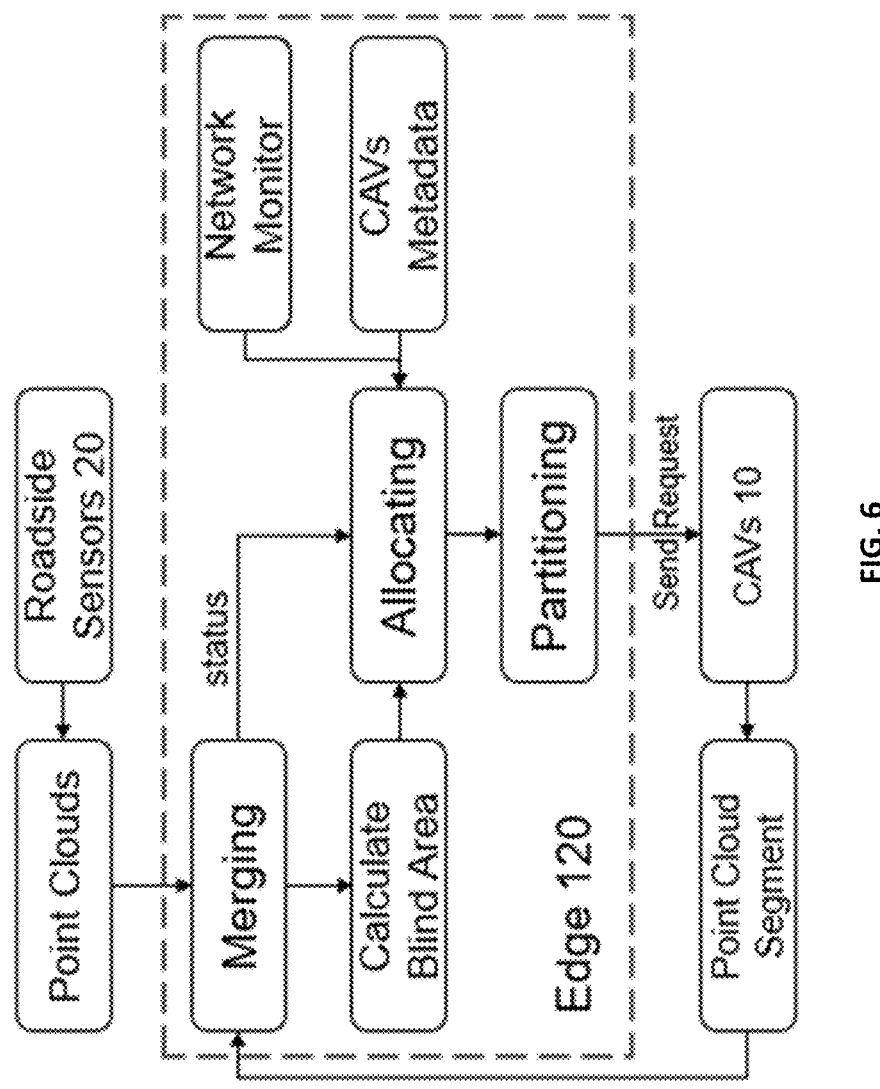
FIG. 6 is a flow diagram showing features of the road monitoring system according to another embodiment of the present invention.

In one embodiment, the received first point cloud data from the RSUs 20 and second point cloud data from the CAVs 10 can be partitioned or sectioned according to segments of the geographical area of interest prior to transmission and in accordance with a specific request from the edge server 120. For example, a potential blind area at a road condition can be estimated by determining the location and shape of the blind areas of each of the surrounding agents including the CAVs 10 and the RSUs 20. The geographical area of interest can be divided into a plurality of non-overlapping segments, such as in the form of a Voronoi diagram, as shown in FIG. 5. The division of the area of interest reduces the size of data to be transmitted and thus, allows an improved rate of transmission of the received point cloud data from the CAVs 10 and RSUs 20 to the edge server 120. If the view of a RSU is blocked by one or more static obstacles, one or more other RSUs located at the area may extend its coverage to the specific area. Dynamic blind areas of one or more CAVs 10 and RSUs 20 which can be caused by any objects entering the area of interest may further be covered by the full point cloud map generated by the processing module 120 of the edge server. Each of the CAVs located in the geographical region or area of interest may send polygons of the divided segments of the region relating to any potential blind areas to the communication modules 110.

In one embodiment, the communication module 110 may extract only dynamic point clouds from the second point cloud data of the CAVs 10 and/or the first point cloud data of the RSUs 20 and subsequently, merge them with static point cloud of point cloud data previously stored in a memory 130 of the system 100, as shown in FIG. 2. For example, a dynamic first point cloud data from the RSUs can be extracted and then merged with a static first point cloud data previously detected and stored in the memory 130. This significantly reduces size of the transmittable data and thus, increases the speed of transmission.

The processing module 120 may collect the point clouds from all of the RSUs and/or the CAVs to process an initial point cloud map. The processed point cloud map will then be processed by partitioning into a plurality of point cloud data partitions. The communication module 110 may then request that the CAVs in the region provide supplementary point cloud data in respect of one or more partitions or subsections of one or more of the detected potential blind areas for further merging to complete a full point cloud map. Information derivable from the full point cloud map in relation to the potential blind areas may then be transmitted to one or more affected CAVs and/or RSUs. Again, the transmission of data in relation to partitions or subsections in the region may significantly reduce the size of the transmitted data and increase the speed of transmission.

Figure 7:
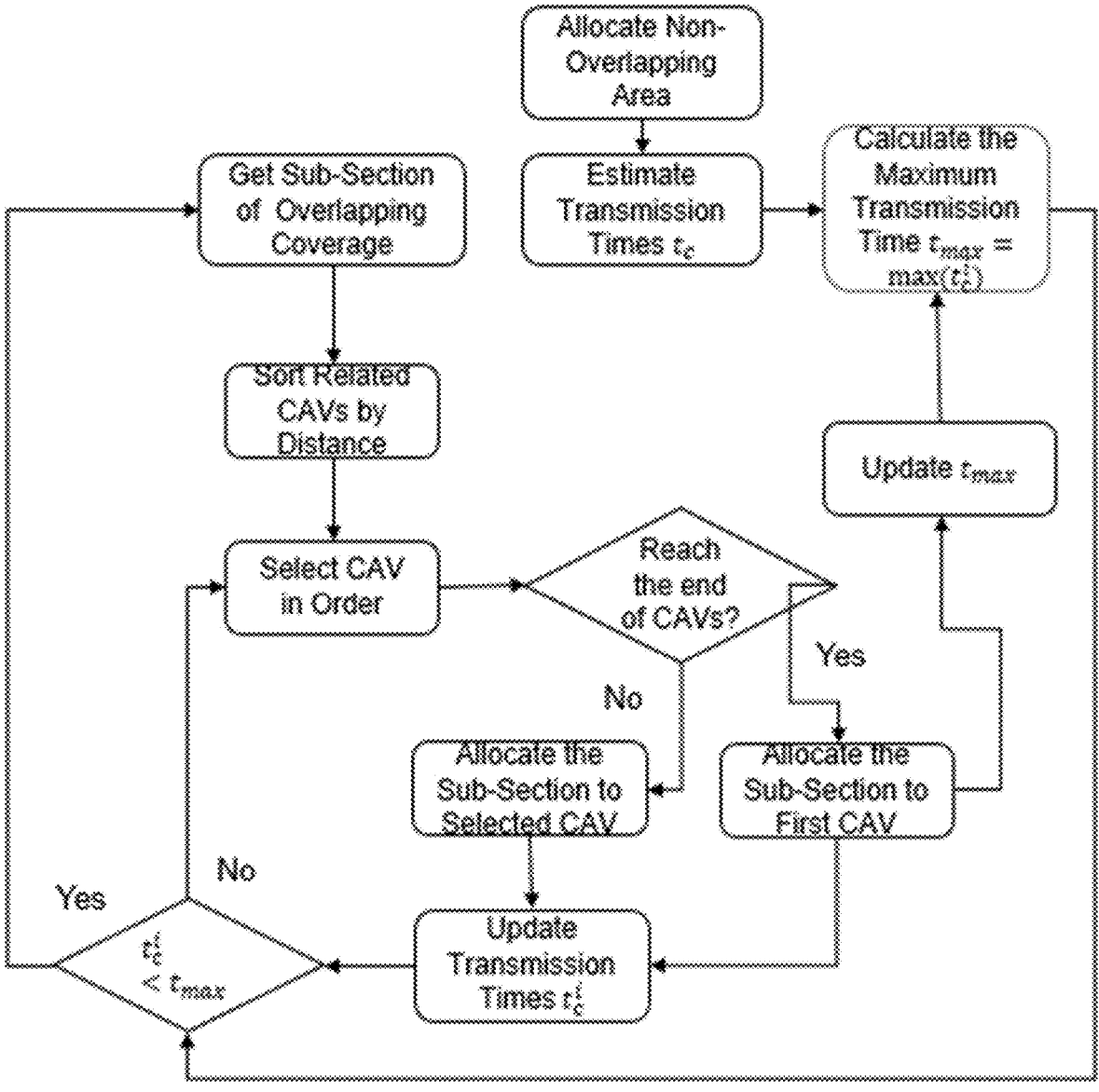
FIG. 7 is a flow diagram showing allocation of CAVs for data transmission.

Similar to the embodiment discussed above, the communication module 110 may identify one or more CAVs which cover the detected blind areas of the RSUs, and request from them point cloud data corresponding to the specific segments of the region for the blind areas. The point cloud of the requested segments will then be merged to complete the full point cloud map for a complete view of the region of interest. As shown in FIG. 7, CAVs in the region will be separately assigned to collect point clouds corresponding to non-overlapping segments of a region of interest. If multiple CAVs are identified in the region, the allocation will be based on the rate of data transmission of the CAVs and/or distance of the CAVs from the communication module 110. For example, a CAV with a fast and stable network which is capable of collecting denser point cloud data, will be allocated for data transmission with priority. The received point cloud segments from the assigned CAV will be integrated with the processed point cloud to complete the full point cloud map. In one embodiment, each CAV can be allocated with a certain number of data subsections which again, can be dependent on its network bandwidth. Ideally, all the CAVs are configured to finish the transmission of data at substantially the same time, and that the processing module 120 will then analyze the integrated point cloud map periodically by processing real-time data with existing data, without the need to wait for all the data segments to be received.

FIG. 7 shows the processing steps by which one or more CAVs are allocated for providing point cloud data segments for a partitioned blind area. First of all, each of the non-overlapping subsections in relation to a potential blind area will be allocated to a respective CAV within the geographical region of interest. The point cloud data size D of a CAV can be estimated as:

$$D = \sum_{d_0}^{d} c \cdot r a_d$$

where c is a constant, r is a sensor resolution, and da: is an area of a sub-section with a discrete distance d from the CAV.

The point cloud transmission time of each (i) CAV can be estimated by:

$$t_c^i = \frac{Di}{N_i}$$

where N is the network bandwidth of the CAV.

The largest transmission time $t_{max}$ of $$t_c^i$$

can be calculated by:

$$t_{max} = \max \left( t_c^i \right)$$

For each overlapping subsection which one or more CAVs may cover, the CAVs will be placed in a queue in ascending order of their distances between the respective subsection and the CAVs.

The subsection will first be allocated to the first CAV in the queue and the corresponding data transmission time will be re-calculated as $$t_c^i.$$

If $$t_c^i$$

is determined to be smaller than or equal to the largest transmission time $t_{max}$, i.e., $$t_c^i \le t_{max},$$

the processing module 120 will confirm the allocation and move on to the next subsection. Otherwise, the processing module 120 will repeat the previous steps for the next CAV in the queue. If $t_c$ of all the CAVs is found to be larger than $t_{max}$, the processing module 120 will then allocate the subsection of overlapping area to the first CAV in the queue and then update $t_{max}$.

It will be understood that all or any of the modules and/or units comprising the system 100 can be implemented by machine code stored in a memory device and executable by a processor. In one embodiment, the present invention may relate to a road monitoring system 100 for detecting a road condition. The system may comprise a memory 130 for storing data and a processor for executing computer readable instructions, wherein the processor is configured by the computer readable instructions when being executed to implement the steps as above described. In one embodiment, the road monitoring system 100 can be configured to comprise a Vehicle-to-Everything (V2X) system.

The present invention provides an infrastructure based, multi-agent cooperative perception system for monitoring a road condition and particularly, for detecting one or more potential blind spots or blind areas in relation to vehicles on the road and subsequently, providing information related to the potential blind areas to the affected vehicles. With the system of the present invention, agents such as CAVs and/or RSUs may work cooperatively to detect objects at blind spots of these agents and to expand view coverage of vehicles to avoid accidents. Generally speaking, the size of one frame of point cloud will be around 500 KB to 2 MB and the C-V2X services may need a processing frequency of more than 10 Hz to process the point cloud data. The system of the present invention is advantageous in that it significantly reduces the amount of road-side point cloud data to around 100 KB to 500 KB for transmission with a cooperative arrangement of infrastructure of about 2 to 3 lamp poles as RSUs, and further reduces the size of blind area data as requested from the CAVs to around 10 KB to 50 KB. With such reduction of size of data transmission, the present invention can be utilized to support collaboration of multiple agents to cover a larger perception area in real-time.

The modules, units and devices as described above may be implemented at least in part in software. Those skilled in the art will appreciate that the above described may be implemented at least in part using general purpose computer equipment or using bespoke equipment.

Here, aspects of the method and system described herein can be executed on any system or apparatus comprising the road monitoring system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "read-able medium" refer to any medium that participates in providing instructions to a processor for execution.

While the invention has been illustrated and described in detail in the drawings and foregoing description, the same is to be considered as illustrative and not restrictive in char-acter, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding descrip-tion of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodi-ments of the invention.

It is to be understood that, if any prior art publication is referred to herein, such reference does not constitute an admission that the publication forms a part of the common general knowledge in the art.

The invention claimed is:

1. A method for detecting blind areas for vehicles in a traffic environment of a defined geographical area, compris-ing:

receiving, via a communication module of a Vehicle-to-Everything (V2X) system, a first point cloud data from one or more designated road-side units (RSUs) located in the defined geographical area;

processing, via a processing module of the V2X system, at least the received first point cloud data to identify any potential blind areas in the traffic environment;

in response to a request from the communication module to one or more designated vehicle on-board data pro-cessing units of vehicles located in the defined geo-graphical area, receiving, via the communication mod-ule, a second point cloud data from said one or more designated vehicle on-board data processing units;

processing, via the processing module, the first point cloud data and the second point cloud data by compar-ing said data to generate merged data comprising a processed point cloud data representing a global view of the traffic environment in the defined geographical area including view information for the detected blind areas; and transmitting, via the communication module, information derived from the processed point cloud data to one or more of the vehicle on-board data processing units of vehicles located in the defined geographical area to provide the view information for the detected blind areas.

2. The method according to claim 1, wherein the step of receiving a first point cloud data from one or more desig-nated RSUs further comprises extracting a dynamic first point cloud data from the first point cloud data, and com-paring and/or merging the extracted dynamic first point cloud data with a static point cloud data previously stored in a memory prior to the processing step.

3. The method according to claim 1, further comprising a step of partitioning the processed point cloud data into a plurality of point cloud data partitions or subsections prior to the transmitting step.

4. The method according to claim 3, wherein the trans-mitting step comprises transmitting information derived from one or more selected point cloud data partitions to one or more of the RSUs and/or the vehicle on-board data processing units located in the defined geographical area.

5. The method according to claim 1, wherein the step of receiving a first point cloud data comprises receiving point cloud data in relation to at least a section of the defined geographical area from the one or more designated RSUs located in the defined geographical area.

6. The method according to claim 5, wherein the at least a section of the defined geographical area comprises a plurality of non-overlapping subsections of the defined geographical area.

7. The method according to claim 1, wherein the step of receiving a second point cloud data comprises receiving point cloud data in relation to at least a section of the defined geographical area from the one or more designated vehicle on-board data processing units of vehicles located in the defined geographical area.

8. The method according to claim 7, wherein the at least a section of the defined geographical area comprises a plurality of non-overlapping subsections of the defined geographical area.

9. The method according to claim 7, wherein the vehicle on-board data processing units of vehicles located in the defined geographical area are designated based on rate of data transmission and/or distance from the communication module.

10. The method according to claim 1, wherein the infor-mation derived from the processed point cloud data trans-mitted via the transmitting step to the one or more vehicle on-board data processing units comprises information relat-ing to one or more blind areas of the one or more RSUs and/or the vehicle on-board data processing units.

11. A Vehicle-to-Everything (V2X) system for detecting blind areas for vehicles in a traffic environment of a defined geographical area, the system comprising:

a communication module of the V2X system configured to receive a first point cloud data from one or more designated road-side units (RSUs) located in the defined geographical area; and a processing module of the V2X system configured to process at least the received first point cloud data to identify any potential blind areas in the traffic environment;

wherein the communication module is configured to receive, in response to a request from the communication module to one or more designated vehicle on-board data processing units of vehicles located in the defined geographical area, a second point cloud data from said one or more designated vehicle on-board data processing units; and wherein the processing module is configured to process the received first point cloud data and second point cloud data by comparing said data to generate merged data comprising a processed point cloud data representing a global view of the traffic environment in the defined geographical area including view information for the detected blind areas;

wherein the communication module is configured to transmit information derived from the processed point cloud data to one or more of the vehicle on-board data processing units of vehicles located in the defined geographical area to provide the view information for the detected blind areas.

12. The system according to claim 11, wherein the communication module is configured to receive and transmit point cloud data and information derived from point cloud data from and to one or more of the RSUs and/or the vehicle on-board data processing units of vehicles located in the defined geographical area via one or more cellular vehicle-to-every (C-V2X) communication networks.

13. The system according to claim 11, wherein the receiving module is configured to extract a dynamic first point cloud data from the first point cloud data, and compare and/or merge the extracted dynamic first point cloud data with a static point cloud data previously stored in a memory prior processing by the processing module.

14. The system according to claim 11, wherein the processing module is configured to partition the processed point cloud data into a plurality of point cloud data partitions, and to assign one or more point cloud data partitions for transmission.

15. The system according to claim 14, wherein the plurality of point cloud data partitions correspond to a plurality of non-overlapping subsections of the defined geographical area.

16. The system according to claim 15, wherein the plurality of non-overlapping subsections correlate to one or more blind areas of the one or more RSUs and/or the vehicle on-board data processing units of vehicles located in the defined geographical area.

* * * * *